(12) United States Patent
Adiraju et al.

(10) Patent No.: US 8,702,502 B2
(45) Date of Patent: Apr. 22, 2014

(54) AUTHENTICATING FILES IN WAGERING GAME MACHINES

(75) Inventors: Srinivyasa M. Adiraju, Vernon Hills, IL (US); Peter R. Anderson, Glenview, IL (US); Steven Mark Campbell, Las Vegas, NV (US); Mark B. Gagner, West Chicago, IL (US); William Hoefferle, Crystal Lake, IL (US); Mark C Pace, Palatine, IL (US); Chad A. Ryan, Henderson, NV (US); Craig J. Sylla, Round Lake, IL (US)

(73) Assignee: WMS Gaming Inc., Waukegan, IL (US)

( * ) Notice: Subject to any disclaimer, the term of this patent is extended or adjusted under 35 U.S.C. 154(b) by 1062 days.

(21) Appl. No.: 12/092,744

(22) PCT Filed: Nov. 9, 2006

(86) PCT No.: PCT/US2006/043646
§ 371 (c)(1),
(2), (4) Date: Dec. 3, 2008

(65) Prior Publication Data
US 2009/0221359 A1 Sep. 3, 2009

Related U.S. Application Data

(60) Provisional application No. 60/735,509, filed on Nov. 10, 2005, provisional application No. 60/744,421, filed on Apr. 7, 2006.

(51) Int. Cl.
*A63F 13/10* (2006.01)

(52) U.S. Cl.
USPC ............................................. 463/29; 463/24

(58) Field of Classification Search
USPC ............... 463/24, 25, 29, 43; 726/2; 713/161, 713/168; 380/251
See application file for complete search history.

(56) References Cited

U.S. PATENT DOCUMENTS

| 6,149,522 A | * | 11/2000 | Alcorn et al. | 463/29 |
| 2003/0078103 A1 | * | 4/2003 | LeMay et al. | 463/43 |

(Continued)

FOREIGN PATENT DOCUMENTS

WO WO-2007058890 A3 5/2007

OTHER PUBLICATIONS

"International Search Report for Application No. PCT/US2006/43646, date mailed Jan. 8, 2008", 4 pgs.

(Continued)

*Primary Examiner* — Damon Pierce
(74) *Attorney, Agent, or Firm* — Nixon Peabody LLP

(57) ABSTRACT

Methods and apparatus for authenticating content in wagering game machines are described herein. In one embodiment, the computer-implemented method includes authenticating a first set of wagering game files stored on a storage device of a wagering game machine. The method can also include starting a wagering game on the wagering game machine if the authentication of the first set of wagering game files is successful. The method can also include authenticating, during the wagering game, a second set of wagering game files stored on the storage device of the wagering game machine, wherein the first set of wagering game files and the second set of wagering game files are mutually exclusive. The method can also include stopping the wagering game if the authentication of the second set of wagering game files is not successful.

16 Claims, 14 Drawing Sheets

(56) References Cited

U.S. PATENT DOCUMENTS

| | | |
|---|---|---|
| 2003/0195033 A1 | 10/2003 | Gazdic et al. |
| 2003/0203756 A1 | 10/2003 | Jackson |
| 2004/0248646 A1 | 12/2004 | Canterbury |
| 2004/0259643 A1 | 12/2004 | Gentles |
| 2005/0009599 A1 | 1/2005 | Ryan |
| 2006/0035713 A1* | 2/2006 | Cockerille et al. ............. 463/42 |
| 2007/0015590 A1* | 1/2007 | Jackson et al. ................ 463/43 |

OTHER PUBLICATIONS

"Written Opinion of the International Searching Authority for Application No. PCT/US2006/43646, date mailed Jan. 8, 2008", 8 pgs.

* cited by examiner

AUTHENTICATING FILES IN WAGERING GAME MACHINES

This patent application is a U.S. National Stage Filing under 35 U.S.C. 371 from International Patent Application Serial No. PCT/US2006/043646, filed Nov. 9, 2006, and published on May 24, 2007 as WO 2007/058890 A2, which claims the priority benefit of U.S. Provisional Patent Application Ser. No. 60/735,509, filed Nov. 10, 2005 and entitled "AUTHENTICATING FILES IN WAGERING GAME MACHINES" by inventors Steven M. Campbell et al., and of U.S. Provisional Patent Application Ser. No. 60/744,421, filed Apr. 7, 2006 and entitled "AUTHENTICATING FILES IN WAGERING GAME MACHINES" by inventors Srinivyasa M. Adiraju et al., the contents of which are incorporated herein by reference in their entirety.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other lights whatsoever. Copyright 2005, 2006, WMS Gaming, Inc.

FIELD

This invention relates generally to the field of wagering game machines and more particularly to the field of file authentication in wagering game machines.

BACKGROUND

A wide variety of computerized wagering game machines are now available to casino operators and players. Computerized wagering game machines range from slot machines to games that are traditionally played live, such as poker, blackjack, roulette, etc. These computerized wagering game machines provide many benefits to game owners and players, including increased reliability over mechanical machines, greater game variety, improved sound and animation, and lower overall management cost.

Typically, when wagering game machines boot-up, they take measures for ensuring that their hardware and software components have not been modified or tampered-with. For example, wagering game machines often include software for verifying digital signatures for all machine components, including both hardware and software components. In some regulatory jurisdictions, gaming regulators prohibit wagering game machines from presenting wagering games until they have authenticated all machine components and software.

SUMMARY

Methods and apparatus for authenticating content in wagering game machines are described herein. In one embodiment, the computer-implemented method includes authenticating a first set of wagering game files stored on a storage device of a wagering game machine. The method can also include starting a wagering game on the wagering game machine if the authentication of the first set of wagering game files is successful. The method can also include authenticating, during the wagering game, a second set of wagering game files stored on the storage device of the wagering game machine, wherein the first set of wagering game files and the second set of wagering game files are mutually exclusive. The method can also include stopping the wagering game if the authentication of the second set of wagering game files is not successful.

BRIEF DESCRIPTION OF THE FIGURES

The present invention is illustrated by way of example and not limitation in the Figures of the accompanying drawings in which.

DESCRIPTION OF THE EMBODIMENTS

Methods and apparatus for authenticating content in wagering game machines are described herein. This description of the embodiments is divided into five sections. The first section provides an introduction to embodiments of the invention. The second section describes example gaming device architectures, while the third section describes example operations performed by some embodiments of the gaming device architectures. The fourth section describes wagering game machines and wagering game networks and the fifth section provides some general comments.

Introduction

This segment introduces embodiments of a wagering game machine that can simultaneously (or virtually simultaneously) present wagering games while authenticating wagering game files, such as audio and video files. By performing these operations simultaneously, embodiments of the invention enable wagering game machines to begin presenting wagering games without delays associated with file authentication. Thus, embodiments can increase wagering game machine availability, which may result in higher player satisfaction and higher profits. This section will continue with a discussion of FIG. 1, which shows how embodiments of a wagering game machine can simultaneously authenticate wagering game files while presenting wagering games.

Figure 1:
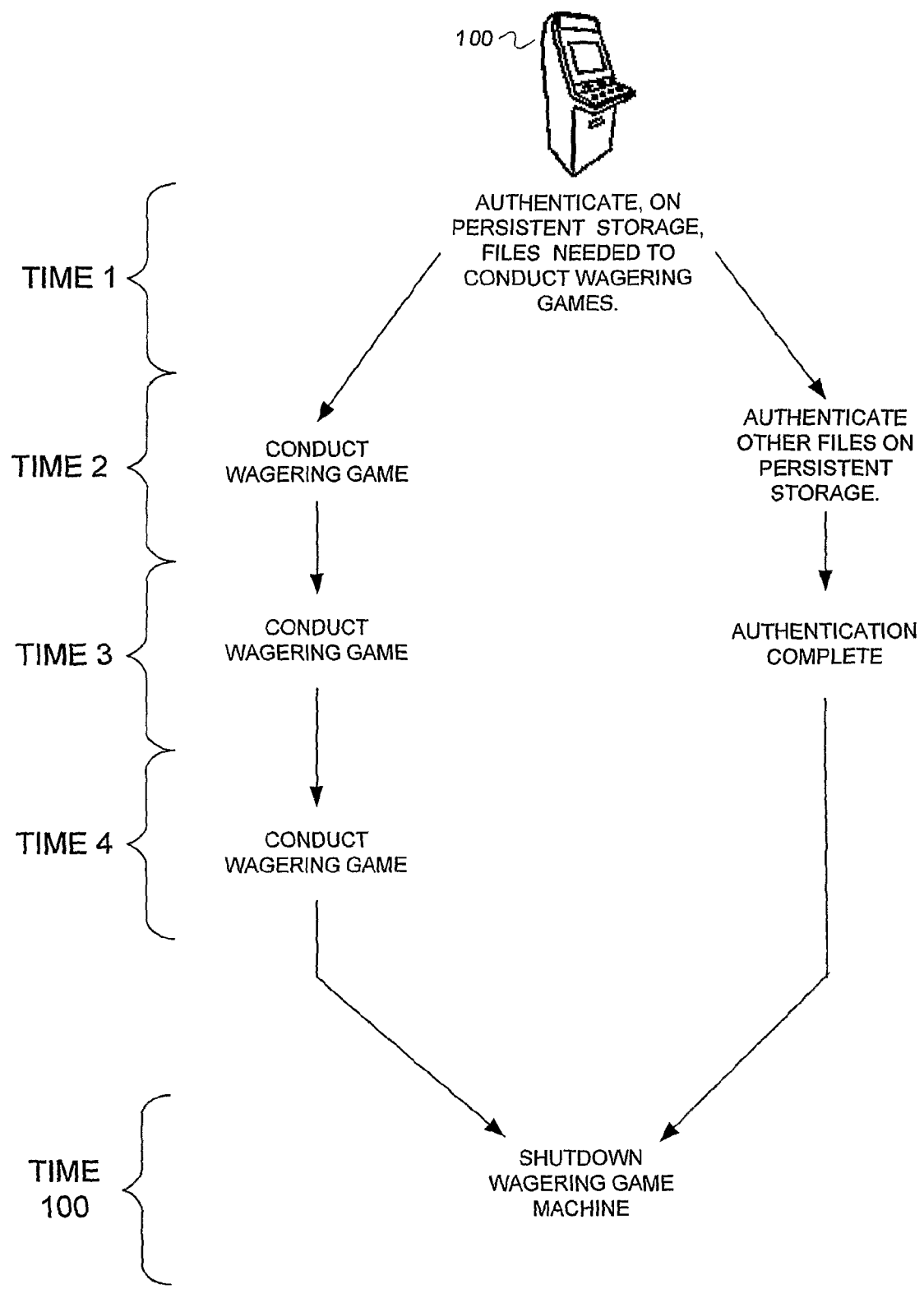
FIG. 1 is graphical representation of simultaneous operations for authenticating files and presenting wagering games, according to example embodiments of the invention.

FIG. 1 is graphical representation of simultaneous operations for authenticating files and presenting wagering games in a wagering game machine, according to example embodiments of the invention. FIG. 1 shows a wagering game machine performing operations over time.

At time 1, the wagering game machine 100 authenticates a minimum set wagering game files needed for presenting wagering games. In one embodiment, the minimum set of files needed for presenting wagering games is mutually exclusive of other files that will be authenticated later. The wagering game files can include just enough audio, video, and other software for presenting a basic version of a wagering game, such as slots or video poker.

After the wagering game machine 100 has authenticated enough files for presenting wagering games, it can begin simultaneous operations. At time 2, the wagering game machine 100 simultaneously presents a wagering game (e.g., slots, video poker, etc.) and authenticates other files. As the wagering game machine 100 authenticates more files, those files become available for use in the wagering games. As a result, the wagering game can evolve from its basic version to a more advanced version, having better audio and video effects.

A time 3, the wagering game machine 100 continues presenting wagering games, while file authentication completes. After file authentication has completed, the wagering game machine 100 has all its files available for use in wagering games.

At time 4, the wagering game machine 100 continues presenting wagering games. Later, at time 100, the wagering game machine shuts down.

In some embodiments, the wagering game machine 100 includes multiple processors or other hardware for simultaneously performing operations (i.e., parallel processing), as shown in FIG. 1. However, in other embodiments, the wagering game machine 100 performs tasks at virtually the same time (i.e., virtually simultaneously). That is, the wagering game machine 100 switches between tasks so rapidly that the switching is substantially imperceptible. For example, at time 2, if the machine 100 is switching between operations for the wagering game and file authentication, such switching is imperceptible to players of the wagering game.

Example Wagering Game Devices

This segment describes an example wagering game device with which embodiments of the invention can be practiced. This segment first presents an example wagering game device architecture and then an example persistent storage device architecture.

Figure 2:
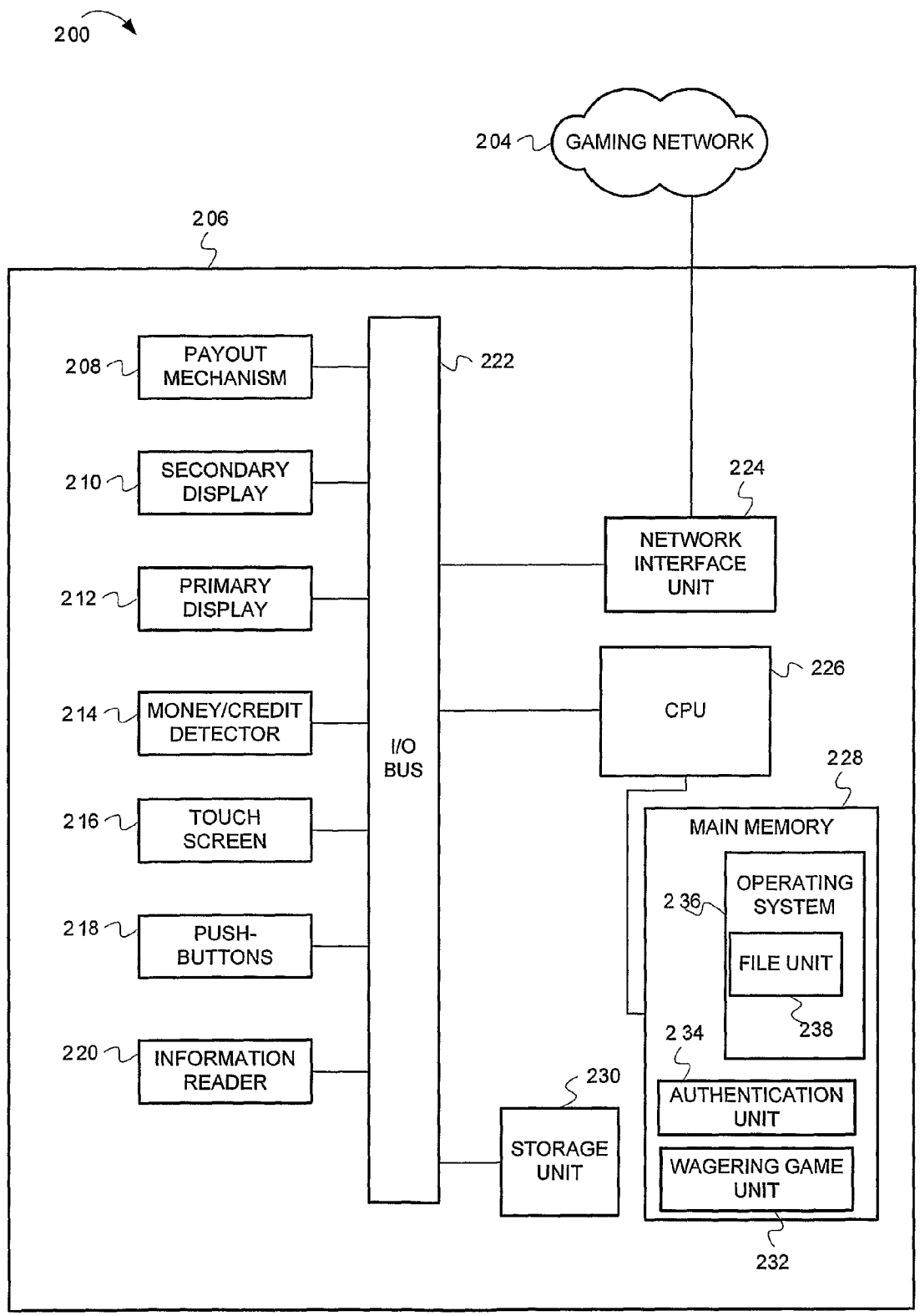
FIG. 2 is a block diagram illustrating a wagering game device, according to example embodiments of the invention.

FIG. 2 is a block diagram illustrating a wagering game device architecture, according to example embodiments of the invention. According to embodiments, the wagering game device 206 can operate as a wagering game machine, mobile wagering game device, wagering game server, and/or other suitable device in a wagering game network (see discussion of FIG. 13).

As shown in FIG. 2, the wagering game device 206 includes a central processing unit (CPU) 226 connected to a main memory unit 228, which includes an authentication unit 234, wagering game unit 232, and operating system 236. The operating system 236 includes a file unit 238. In one embodiment, the wagering game unit 232 can present any suitable casino-style wagering game, such as video poker, video black jack, video slots, video lottery, etc. In one embodiment the authentication unit 234 can authenticate files and verify other components (e.g., the storage unit 230), as described herein. In one embodiment, the operating system 236 and file unit 238 predictively load files into the main memory 228 and facilitate access to data (e.g., files) stored in components, such as the main memory unit 228 and the storage unit 230.

The CPU 226 is also connected to an input/output (I/O) bus 222, which facilitates communication between the wagering game device's components. The I/O bus 222 is connected to a payout mechanism 208, secondary display 210, primary display 212, money/credit detector 214, touchscreen 216, push-buttons 218, information reader 220, and storage unit 230. The I/O bus 222 is also connected to a network interface unit 224, which is connected to a wagering game network 204.

In one embodiment, the wagering game device 206 can include additional peripheral devices and/or more than one of each component shown in FIG. 2. For example, in one embodiment, the wagering game device 206 can include multiple network interface units 224 and multiple CPUs 226. In one embodiment, any of the components can be integrated or subdivided (e.g., the operating system 236 can include the authentication unit 234). Additionally, in one embodiment, the components of the wagering game machine 206 can be interconnected according to any suitable interconnection architecture (e.g., directly connected, hypercube, etc.).

In one embodiment, any of the components of the wagering game device 206 can include machine-readable media including instructions for performing operations described herein. Machine-readable media includes any mechanism that provides (i.e., stores and/or transmits) information in a form readable by a machine (e.g., a computer). For example, tangible machine-readable media includes read only memory (ROM), random access memory (RAM), magnetic disk storage media, optical storage media, flash memory devices, etc. Furthermore, components of the wagering game device 206 can include other types of logic (e.g., firmware) for executing the operations described herein. In one embodiment, any component of the wagering game device 206 (e.g., the wagering game unit 232) can be made of software, hardware, or a combination of software and hardware.

Figure 3:
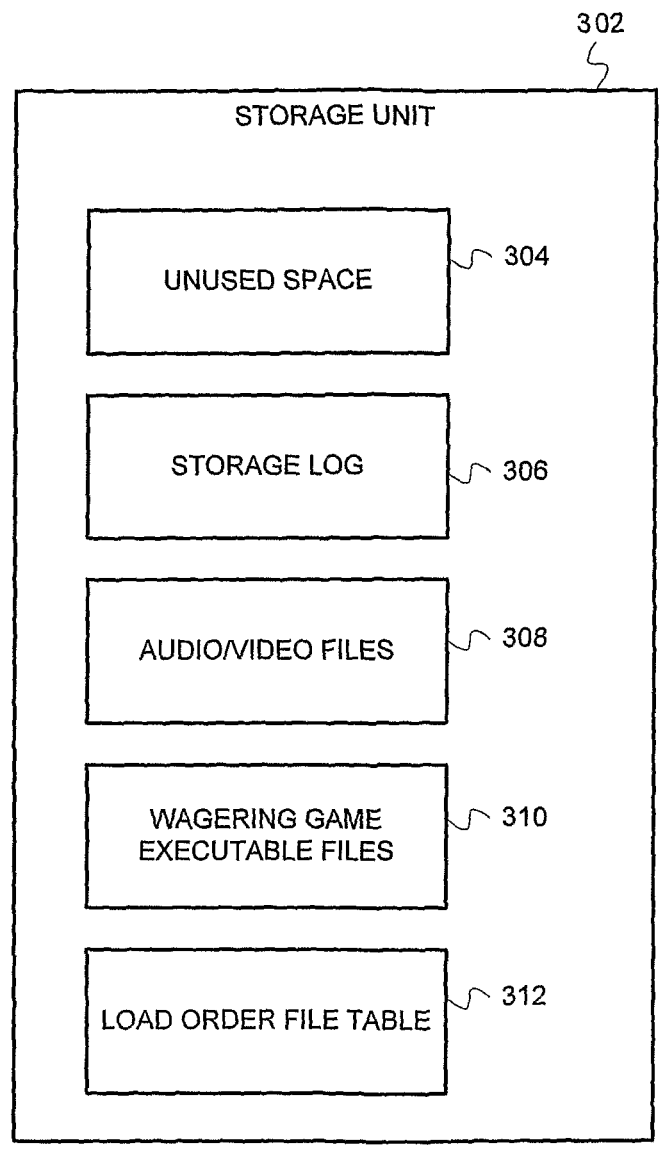
FIG. 3 is a block diagram illustrating a storage unit, according to embodiments of the invention.

While the discussion of FIG. 2 describes the various components of a wagering game device, FIG. 3 describes storage devices in greater detail. This description continues with FIG. 3.

FIG. 3 is a block diagram illustrating a storage unit, according to embodiments of the invention. According to embodiments, the storage unit 302 can include a hard disk drive, flash memory device, read only memory device, or any high-capacity storage device. As shown in FIG. 3, the storage unit 302 includes a load order file table 312, wagering game executable files 310, audio/video files 308, storage log 306, and unused space 304. In one embodiment, a wagering game device can use the components of the storage unit 302 for simultaneously presenting wagering games and authenticating files.

In one embodiment, the load order file table 312 includes a table indicating an order in which files are loaded when preparing a wagering game device for operation. In one embodiment, a wagering game device uses both the wagering game executable files 310 and the audio/video files 308 for presenting wagering games. The wagering game executable files 310 the audio/video files 308 can include software modules and data used for determining and presenting wagering game results. Embodiments of the invention can employ any suitable file structure, such as a directory file structure.

Operations performed by embodiments of the invention are described in the next section.

Operations

This segment describes operations performed by embodiments of the invention. In the discussion below, the flow diagrams will be described with reference to the block diagrams presented above. In certain embodiments, the operations are performed by instructions residing on machine-readable media (e.g., software), while in other embodiments, the operations are performed by hardware and/or other logic (e.g., firmware).

Authentication

Figure 4:
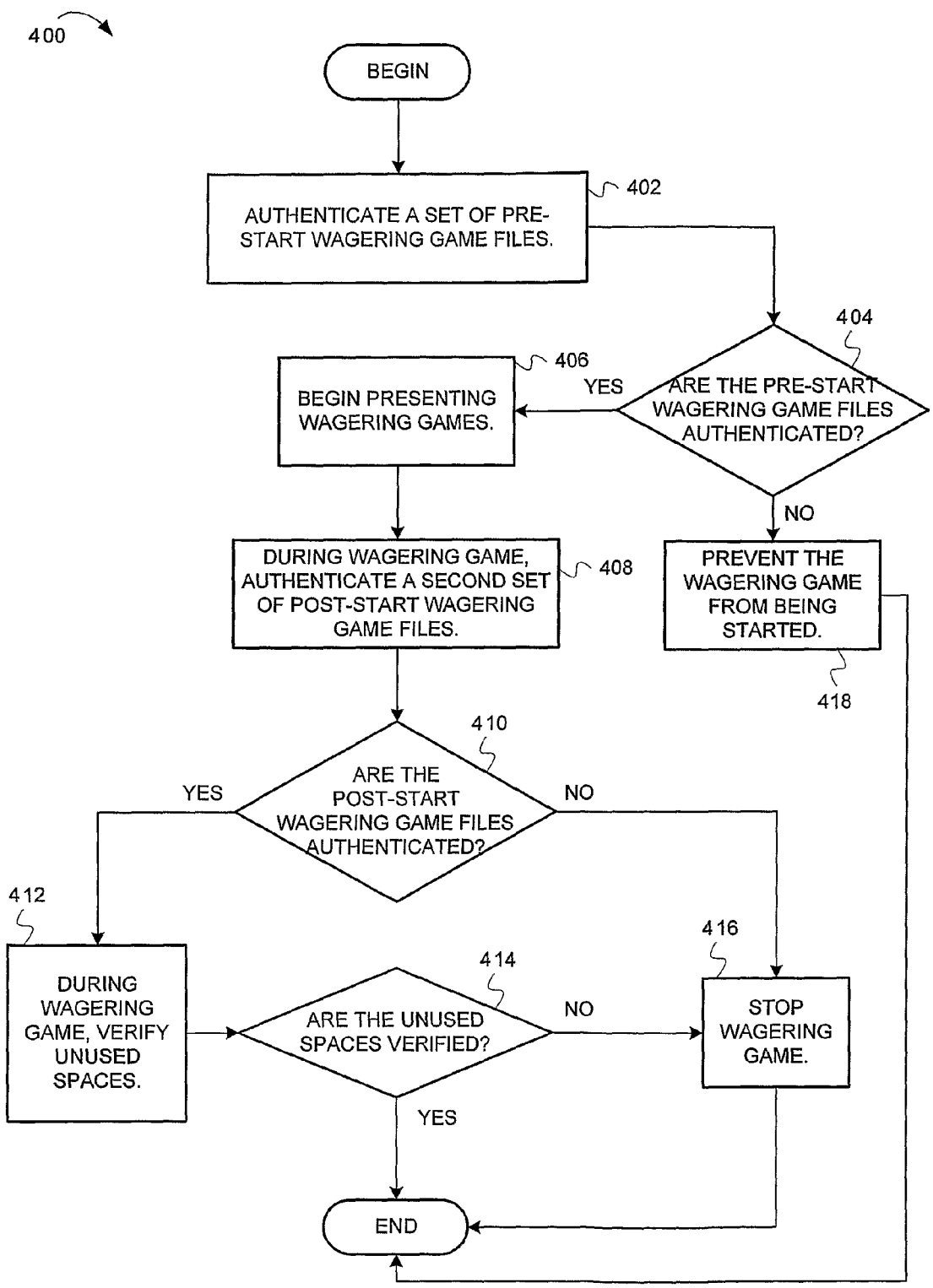
FIG. 4 is a flow diagram illustrating operations for simultaneously (or virtually simultaneously) presenting wagering game while authenticating wagering game files and components, according to example embodiments of the invention.
Figure 5:
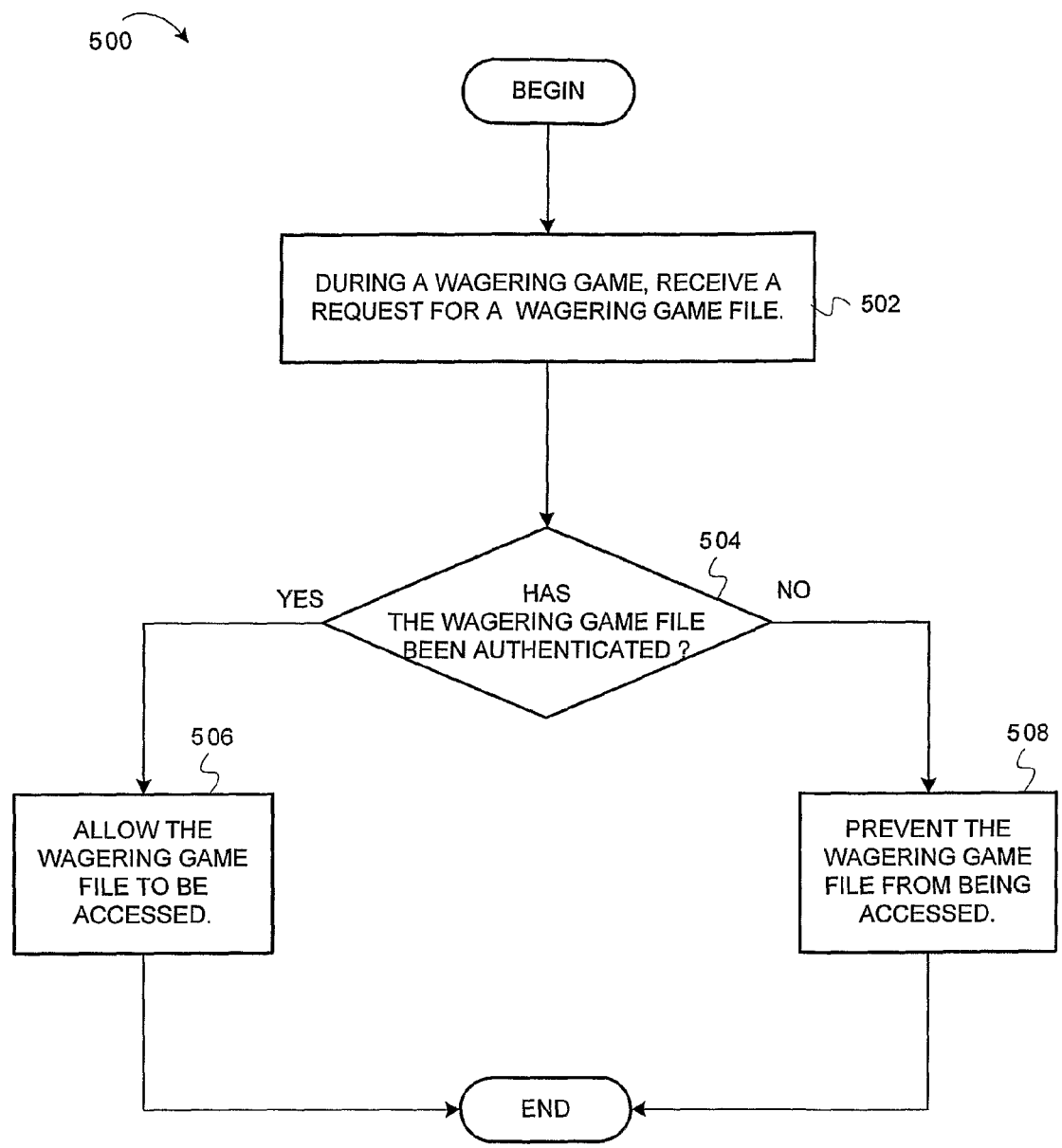
FIG. 5 is a flow diagram illustrating operations for granting access to wagering game files, according to example embodiments of the invention.
Figure 6:
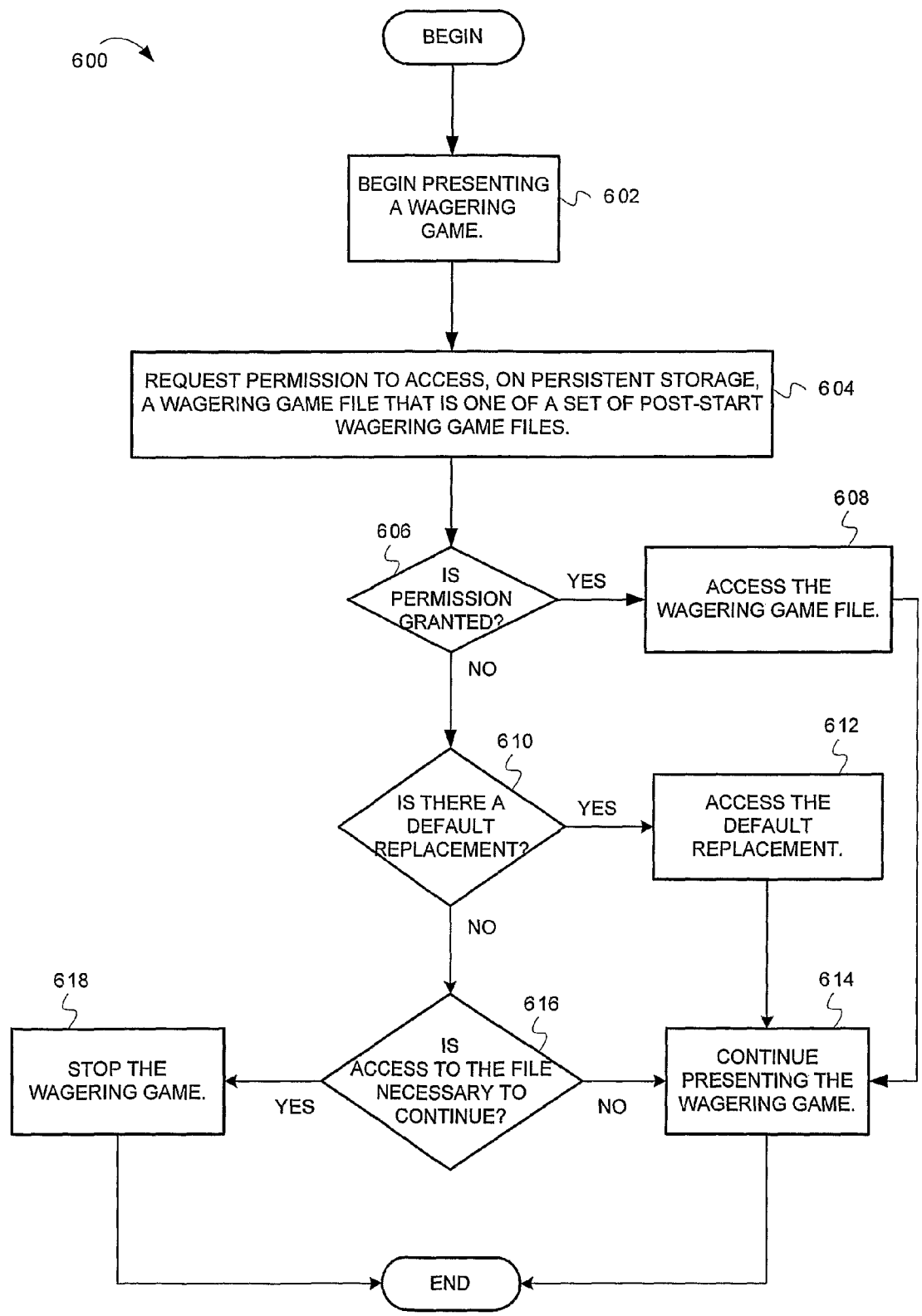
FIG. 6 is a flow diagram illustrating operations for requesting access to wagering in files, according to example embodiments of the invention.

FIGS. 4-6, which are discussed below, describe operations for simultaneously (or virtually simultaneously) authenticating files/components and presenting wagering games. These Figures will be described with reference to the embodiments described above. This description continues with a discussion of FIG. 4.

FIG. 4 is a flow diagram illustrating operations for simultaneously (or virtually simultaneously) presenting wagering games while authenticating wagering game files and components, according to example embodiments of the invention. The flow 400 begins at block 402.

At block 402, basic wagering game files are authenticated. For example, a wagering game machine's authentication unit 234 authenticates a basic set of files necessary for presenting a basic version of a wagering game. In one embodiment, the set of files includes only those wagering game executable files 310 and audio/video files 308 needed for presenting a basic version of a wagering game. In one embodiment, the basic set of files is mutually exclusive of another set of files that will be authenticated later, at block 408. In one embodiment, the authentication unit 234 can authenticate the files using any suitable authentication technique, such as verifying digital signatures associated with the files. The flow continues at block 404.

At block 404, a determination is made about whether the basic wagering game files have been authenticated. For example, the authentication unit 234 determines whether the basic wagering game files have been authenticated. If the files have been authenticated, the flow continues at block 406. Otherwise, the flow continues at block 418.

At block 406, wagering games begin. For example, the wagering game unit 232 begins presenting a wagering game using the basic wagering game files, which were authenticated at block 402. In one embodiment, only authenticated files can be used in presenting wagering games. In one embodiment, instead of presenting wagering games, the wagering game unit 232 presents audio and video for attracting players to the wagering game machine 206, while being capable of presenting wagering games if activated by a player. The flow continues at block 408.

At block 408, during the wagering game, additional wagering game files are authenticated. For example, while the wagering game unit 232 presents a wagering game, the authentication unit 234 authenticates more of the audio/video files 308 and wagering game executable files 310. The flow continues at block 410.

At block 410, a determination is made about whether the additional wagering game files have been authenticated. For example, the authentication unit 234 determines whether the additional audio/video files 308 and wagering game executable files 310 have been authenticated. If the files have been authenticated, the flow continues at block 412. Otherwise, the flow continues at block 416.

At block 412, during the wagering game, the storage unit's unused space is verified. For example, while the wagering game unit 232 presents a wagering game, the authentication unit 234 verifies the storage unit's unused space 304. In one embodiment, the authentication unit scans the unused space to make sure it does not contain rogue code or impermissible data. The flow continues at block 414.

At block 414, a determination is made about whether the unused space has been verified. For example, the authentication unit 234 determines whether the empty space has been verified. If the unused space has not been verified, the flow continues at block 416. Otherwise, the flow ends.

At block 416, the wagering game is stopped. For example, the authentication unit 234 informs the wagering game unit 232 that a file/component could not be authenticated. As a result, the wagering game unit 232 stops the wagering game. In one embodiment, the authentication unit 234 informs attendants of the error. From block 416, the flow ends.

As discussed above, the wagering game device 206 can present a basic version of a wagering game while contemporaneously authenticating files. As more files are authenticated, the wagering game device 206 can use those files to enhance the wagering game. FIG. 5 describes operations for determining which files can be accessed and used for augmenting basic wagering games.

FIG. 5 is a flow diagram illustrating operations for determining access to wagering game files, according to example embodiments of the invention. The flow 500 commences at block 502.

At block 502, during a wagering game, a request is received for a wagering game file. For example, while the wagering game unit 232 is presenting a wagering game, the operating system 236 receives a file request from the wagering game unit 232. The request can be for a file including audio and video data, bonus event executables, or any other suitable wagering game content. The flow continues at block 504.

At block 504, a determination is made about whether the requested wagering game file has been authenticated. For example, the operating system 236 determines whether the wagering game file has been authenticated. In one embodiment, the operating system 236 compares a number associated with the requested file with an index corresponding to the most recently authenticated file. If the number is less than the index, the file has been authenticated. In another embodiment, the operating system 236 makes the determination by inspecting a table associated with the files of the storage unit

302. If the requested file has been authenticated, the flow continues at block 506. Otherwise, the flow continues at block 508.

At block 506, access to the wagering game file is allowed. For example, the operating system 236 loads the requested file into the memory unit 228 and allows the wagering game unit 232 to access it. From block 506, the flow ends.

At block 508, access to the requested file is denied. For example, the operating system 236 denies access to the requested file and returns an error message. From block 508, the flow ends.

While FIG. 5 describes operations for granting/denying access to wagering game files, FIG. 6 describes operations for requesting access to wagering game files.

FIG. 6 is a flow diagram illustrating operations for requesting access to wagering in files, according to example embodiments of the invention. The flow 600 commences at block 602.

At block 602, a wagering game is begun. For example, the wagering game unit 232 begins presenting a wagering game. The flow continues at block 604.

At block 604, access for a wagering game file is requested, where the wagering game file is not one of the basic wagering game files. For example, the wagering game unit 232 requests an audio file other than those required for presenting a basic version of the wagering game. The flow continues at block 606.

At block 606, a determination is made about whether access to the file is granted. For example, the wagering game unit 232 determines whether the operating system 236 granted access to the requested file. In one embodiment, the wagering game unit 232 determines whether the operating system 236 delivered a file handle for the requested file. If access is not granted, the flow continues at block 610. Otherwise, the flow continues at block 608.

At block 608, the wagering game file is accessed. For example, the wagering game unit 232 accesses the requested wagering game file for use in presenting the wagering game. The flow continues at block 614.

At block 610, a determination is made about whether there is a default replacement. For example, the wagering game unit 232 determines whether there is a default replacement file for the inaccessible file. If there is a default replacement file, the flow continues at block 612. Otherwise, the flow continues at block 616.

At block 612, the default replacement file is accessed. For example, the wagering game unit 232 requests and receives access to the default replacement file. In one embodiment, the default replacement file has been authenticated by the authentication unit 234. The flow continues at block 614.

At block 614, the wagering game continues. For example, the wagering game unit 232 continues presenting the wagering game. As shown in FIG. 6, embodiments can continue presenting the wagering game with either the requested file or a default replacement. From block 614, the flow ends.

At block 616, a determination is made about whether access to the file is necessary for continuing the wagering game. For example, the wagering game unit 232 determines whether it needs the requested file in order to continue the wagering game. If the requested file is needed, the flow continues at block 618. Otherwise, the flow continues at block 614.

At block 618, the wagering game is stopped. For example, the wagering game unit 232 stops presenting the wagering game. From block 618, the flow ends.

File Dependencies

This section describes how wagering game files may be related and how relationships between wagering game files can be used for reducing latencies in a wagering game device.

Figure 7:
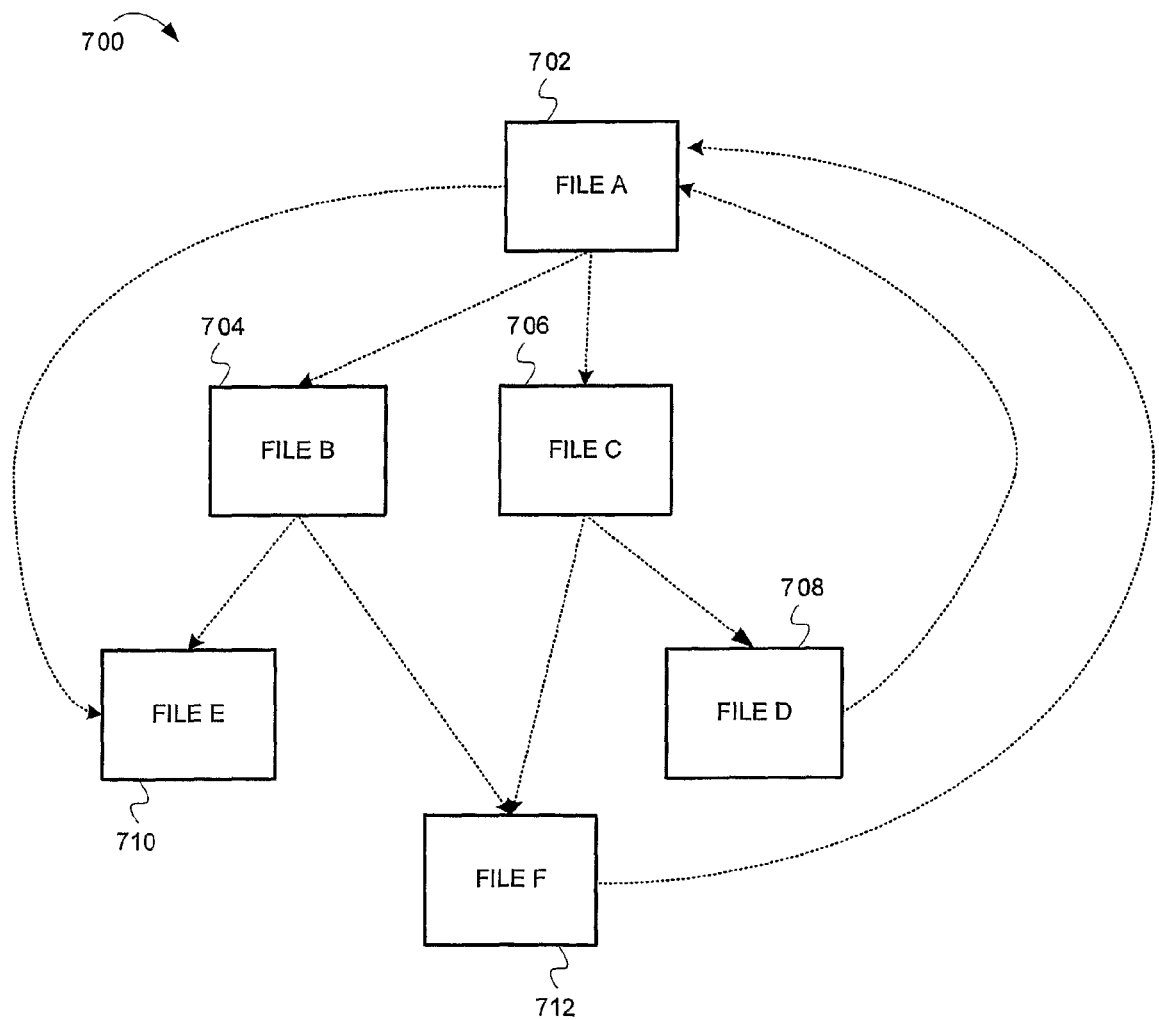
FIG. 7 is a graph illustrating file dependencies associated with wagering game files, according to exemplary embodiments of the invention.

FIG. 7 is a graph illustrating file dependencies associated with wagering game files, according to exemplary embodiments of the invention. In one embodiment, several files will be needed over the course of a wagering game. For example, as shown in FIG. 7, a wagering game may first need file A (702) and then other files. After using file A (702), the wagering game may need either file E (710), file B, (704) or file C (706), depending on variables such as user input, game outcome, etc. As the wagering game progresses, other files may be needed. As shown in FIG. 7, after a wagering game uses file C (706), it will need file D (708) or file F (712). A wagering game may continue using different files until an end state is encountered (i.e., there is no directed edge progressing to another file; see file E (710)).

In addition to file-to-file dependencies, there may be dependencies between game states and files. Game states can include information about slot reel positions, wager amounts, bonus event status, wagering game results, progress and location within a wagering game, and any other information suitable for tracking progress and results of a wagering game. Game states can include all information necessary for restarting wagering games from a point where a wagering game terminated. When certain game states are encountered, specific files will be needed. For example, in a situation where a player is eligible for a game option (e.g., bonus event, extra spin, etc.), when the player chooses/activates a game option, wagering game unit 232 will need files associated with the game option.

Because dependencies between files, game states, and/or player states are often known, wagering game devices can include logic for loading and authenticating files before they are needed.

In the following sections, this description will present methods for predictively loading, authenticating, and transmitting wagering game files.

Predictive Main Memory Loading

This section describes operations for predictively loading files into a wagering game device's main memory and operations for servicing file access requests in a wagering game machine. This description continues with FIG. 8.

Figure 8:
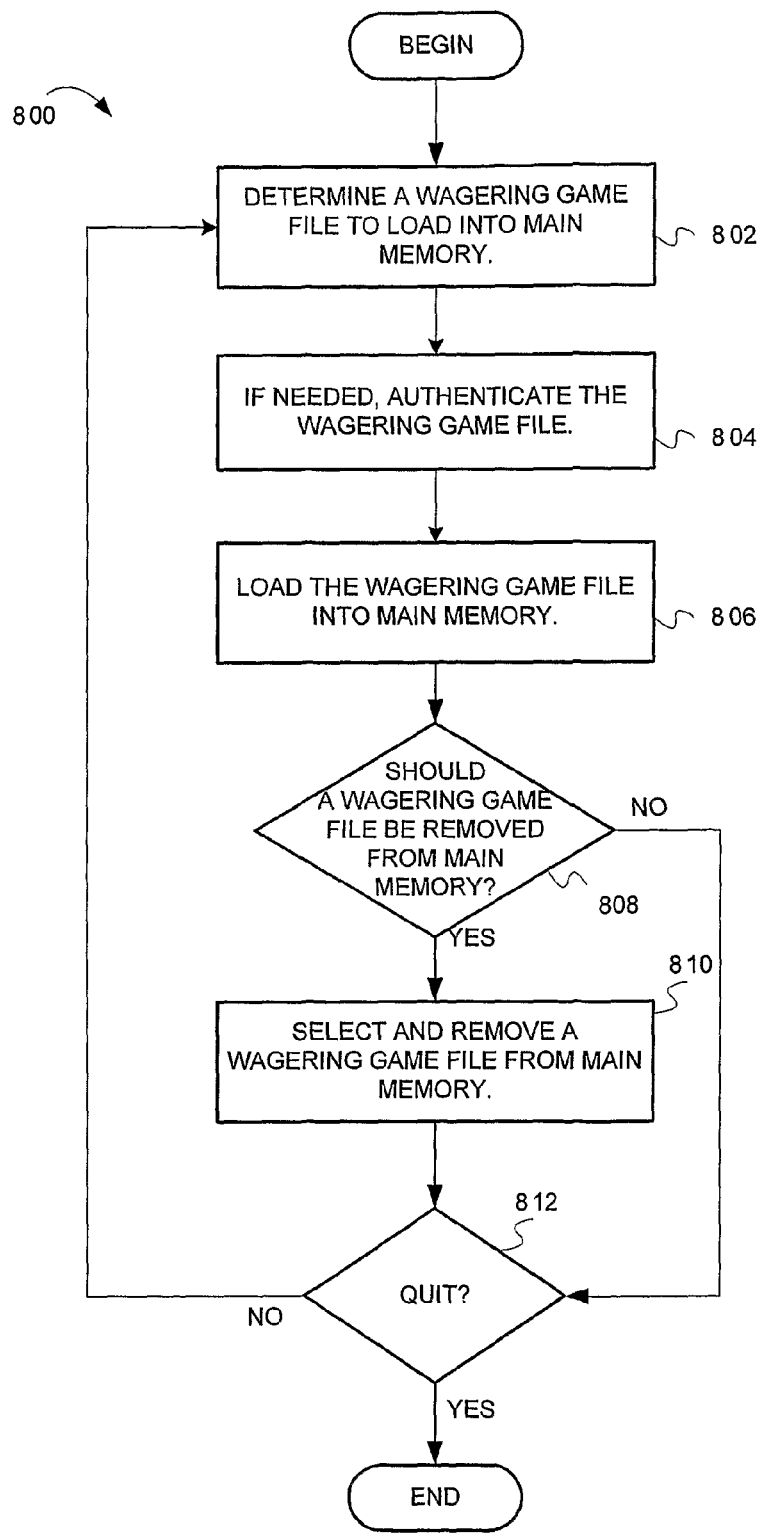
FIG. 8 is a flow diagram illustrating operations for predictively loading/removing wagering game files into/from a wagering game device's main memory, according to example embodiments of the invention.

FIG. 8 is a flow diagram illustrating operations for predictively loading/removing wagering game files into/from a wagering game device's main memory, according to example embodiments of the invention. The flow 800 begins at block 802.

At block 802, a wagering game device's file unit 238 selects a wagering game file to load into main memory 228. In one embodiment, the file unit 238 selects the file based on file dependencies and file usage. For example, the file unit 238 may maintain data (e.g., graph 700) indicating dependencies between wagering game files or dependencies between game states and wagering game files needed for presenting a wagering game. The file unit 238 can use file dependencies and file usage information to determine other files that may be needed soon. As a result, the file unit 238 can select files for loading into main memory 228 before the files are needed for use in wagering games. The flow continues at block 804.

At block 804, the authentication unit 234 authenticates the file, if necessary. In one embodiment, only certain wagering game files require authentication just before being loaded into main memory. The flow continues at block 806.

At block 806, the file unit 238 loads the wagering game file into the main memory 228. In one embodiment, after the file has been loaded into main memory 228, it is available for use by the wagering game unit 232 or other components of the wagering game device 206. In one embodiment, the main memory 228 can store a plurality of wagering game files. The flow continues at block 808.

At block 808, the file unit 238 determines whether it should remove a wagering game file from main memory 228. If the file unit 238 should remove a file from main memory 228, the flow continues at block 810. Otherwise, the flow continues at block 812.

At block 810, the file unit 238 selects and removes a wagering game file from main memory 228. In one embodiment, the file unit 238 selects and removes wagering game files to make room for other files that may be needed soon. In one embodiment, the file unit 238 evicts wagering game files from main memory 228 based on file dependencies and file usages (e.g., files currently in-use, recently used files, etc.). For example, referring to FIG. 7, the file unit 238 may evict file A (702) from main memory after file B (704) is in-use. Other embodiments can use other criteria for evicting files from main memory. The flow continues at block 812.

At block 812, the file unit 238 determines whether it should stop predictively loading wagering game files. If the file unit 238 should stop predictively loading wagering game files, the flow ends. Otherwise, the flow continues at block 802.

Figure 9:
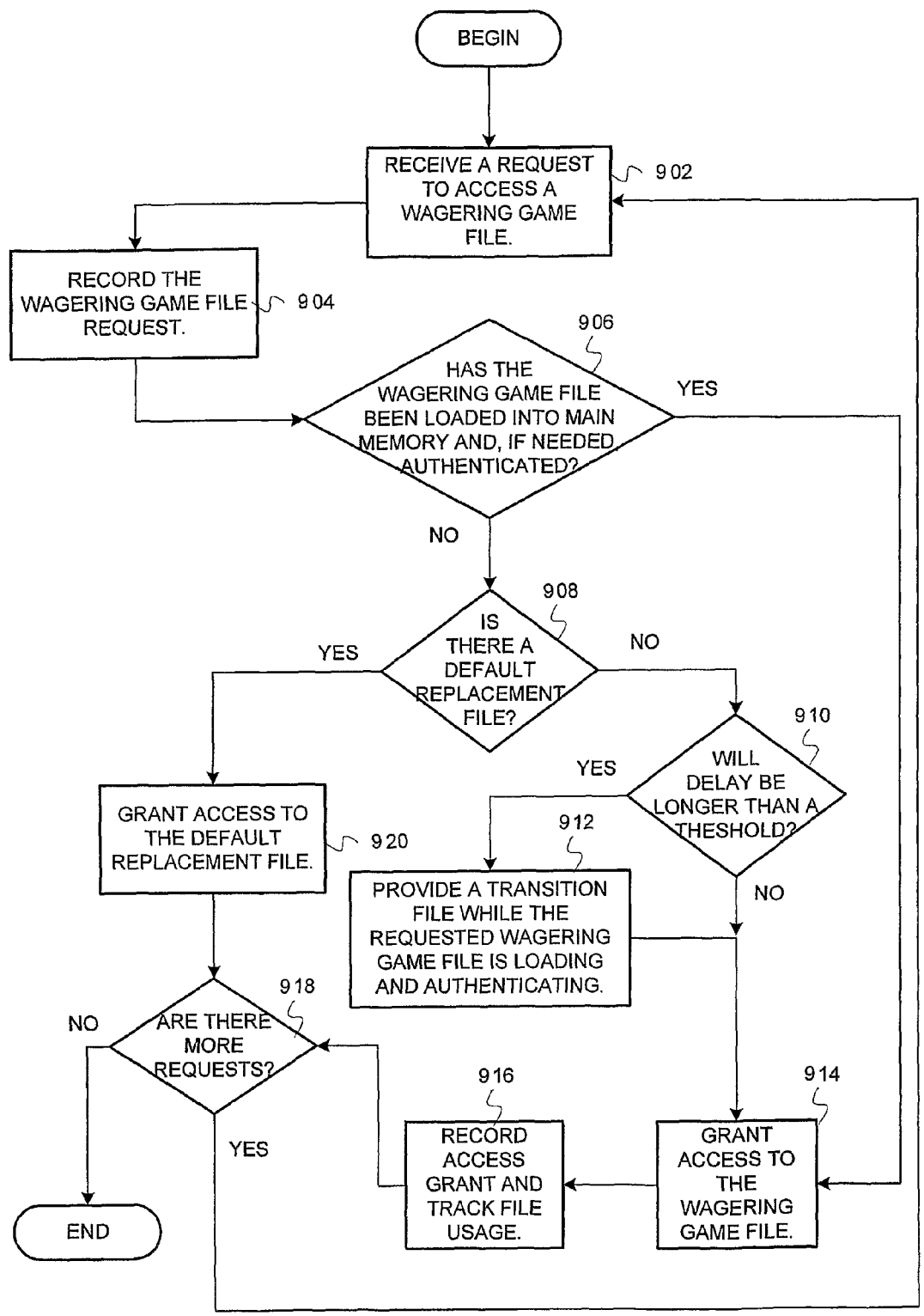
FIG. 9 is a flow diagram illustrating operations for servicing file access requests, according to example embodiments of the invention.

While FIG. 8 describes operations for predictively loading files into a wagering game device's main memory, FIG. 9 describes operations for providing access to wagering game files. This description continues with a discussion of FIG. 9.

FIG. 9 is a flow diagram illustrating operations for servicing file access requests, according to example embodiments of the invention The flow 900 begins at block 902.

At block 902, the file unit 238 receives a request to access a wagering game file. File access requests can originate from the wagering game unit 232 or any other component of the wagering game device 206. The flow continues at block 904.

At block 904, the file unit 238 records the file access request. In one embodiment, a record of the file request can be used for predictively loading wagering game files (e.g., see discussion of FIG. 8). The flow continues at block 906.

At block 906, the file unit 238 determines whether the requested wagering game file has been loaded into main memory 228 and (if needed) authenticated. As noted above, in one embodiment, certain files must be authenticated before they are loaded into main memory 228. If the file has not been loaded into main memory and (if needed) authenticated, the flow continues at block 908. Otherwise, the flow continues at block 914.

At block 908, the file unit 238 determines whether there is a default replacement for the requested file. If there is no default replacement for the requested wagering game file, the flow continues at block 910. Otherwise, the flow continues at block 920.

At block 910, in a situation where the requested wagering game file is not in main memory 228 and there is no default replacement, the file unit 238 determines whether there will be a file access delay that exceeds a given threshold. If there will not be a file access delay longer than a given threshold, the flow continues at block 914. Otherwise, the flow continues at block 912.

At block 912, the file unit 238 provides a transition file, while it loads and/or authenticates the requested wagering game file. In one embodiment, the transition file can include content (e.g., text, graphics, audio, etc.) for presentation during the file access delay. The flow continues at block 914.

At block 914, the file unit 238 provides access to the requested wagering game file in the main memory 228. In one embodiment, before the file unit 238 loads an entire wagering game file into the main memory 228, it can provide access to a portion of the file that has been loaded. In such an embodiment, the flow 900 would proceed from block 906 to block 914 when a portion of the file is loaded into the main memory 228 and authenticated (if needed). The flow continues at block 916.

At block 916, the file unit 238 records the access grant and tracks usage of the wagering game file. In one embodiment, information about access grant and file usage can be used for predictively loading wagering game files into main memory 228. The flow continues at block 918.

At block 918, the file unit 238 determines whether there are more file requests that need service. If there are more file requests that need service, the flow continues at block 902. Otherwise, the flow ends.

At block 920, in a situation where the requested file was not present in main memory and/or authenticated, but where there is a default replacement for the requested file, the file unit 238 grants access to the default replacement file. In one embodiment, the default replacement file includes data that can be used in place of data in the requested file. In one embodiment, the default replacement file includes enough data to continue presenting a basic version of a wagering game, whereas the requested file may include data useful in presenting enhanced features of the wagering game. The flow continues at block 918.

Predictive Memory Loading with Predictive Authentication

This section describes operations for predictively loading files into a wagering game device's main memory, while contemporaneously authenticating files stored in the wagering game device's persistent data store. This section also describes operations for servicing file access requests in an environment in which wagering game files are predictively loaded and predictively authenticated. This description continues with FIG. 10.

Figure 10:
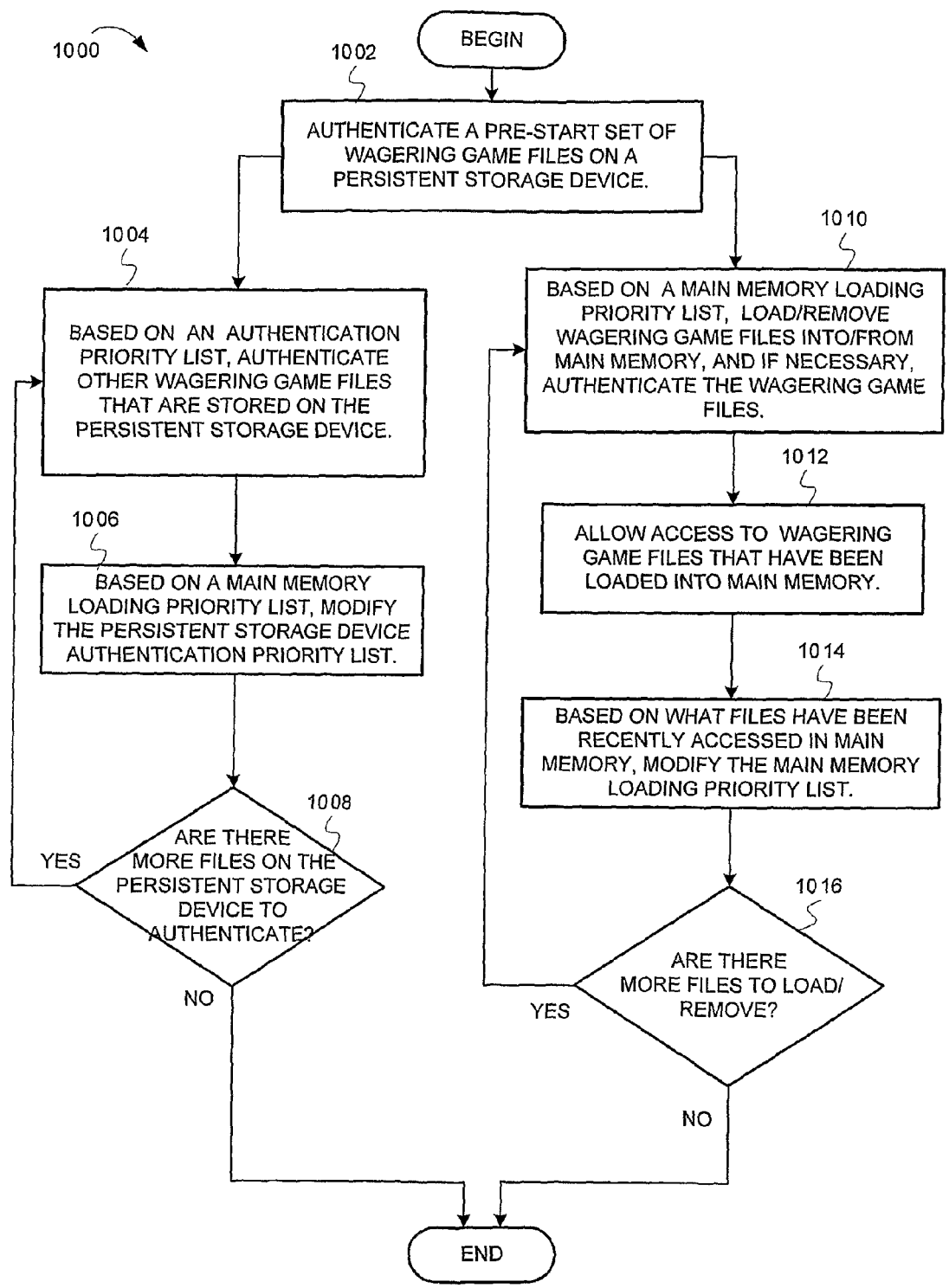
FIG. 10 is a flow diagram illustrating operations for predictively authenticating wagering game files on a persistent storage device and predictively loading wagering game files into main memory, according to example embodiments of the invention.

FIG. 10 is a flow diagram illustrating operations for predictively authenticating wagering game files on a persistent storage device and predictively loading wagering game files into main memory, according to example embodiments of the invention. The flow 1000 begins at block 1002.

At block 1002, the authentication unit 234 authenticates a set of pre-start wagering game files residing on the storage unit 230. In one embodiment, the pre-start wagering game files include a basic set of files necessary for presenting a basic version of a wagering game. That is, the basic set of files includes only those wagering game executable files 310 and audio/video/data files 308 needed for presenting a basic version of a wagering game. The flow continues in parallel at blocks 1004 and 1010.

At block 1004, the authentication unit 234 authenticates, based on an authentication priority list, additional files stored on the storage unit 230. In one embodiment, the authentication priority list can include any data structure suitable for indicating an order in which the additional wagering game files will be authenticated. The additional files can include wagering game executable files and data useful in presenting an enhanced version of the wagering game.

In one embodiment, file priorities are assigned based on file dependencies and file usage. For example, files may be assigned a high priority when file dependencies and file usage indicate that the files will be needed soon. In contrast, files may be assigned low priority when file dependencies and file usage indicate that the files will not be needed soon. In another embodiment, priority can be based on dependencies between files and game states. For example, when game states indicate that certain files may be needed soon, those files are assigned high priorities. In contrast, when game states indicate that certain files will not be needed soon, those files are assigned low priorities. In other embodiments, priority can be based on other suitable criteria.

The flow continues at block 1006.

At block 1006, the authentication unit 234 modifies the authentication priority list based on a loading priority list (see discussion of block 1010). For example, in one embodiment, the authentication unit 234 can assign files a higher priority when related files have been loaded into main memory. When files are removed from main memory 228, the authentication unit 234 can assign related files a lower priority. In one embodiment, the relative priority of files in the authentication list is automatically adjusted to correspond to their relative priority in the memory loading list. For example, if a file is moves up in priority for loading, the file also moves up in priority for authentication. Although authentication and loading can be separate processes operating in parallel, they can remain correlated. The authentication unit 234 can also base its priority assignments on other criteria. The flow continues at block 1008.

At block 1008, the authentication unit 234 determines whether there are more files to authenticate. If there are no more files to authenticate, the flow ends. Otherwise, the flow continues at block 1004.

At block 1010, based on a loading priority list, the file unit 238 loads and/or removes wagering game files into and/or out of the main memory 228. In one embodiment, the file unit 238 determines the loading priority list based on file dependencies and file usage. For example, the file unit 238 may assign high priorities when file dependencies and file usage indicate that files will be needed soon. In contrast, the file unit 238 may assign low priorities when files will probably not be needed soon. In one embodiment, priority can be based on other suitable criteria. The authentication unit 234 can authenticate those files that must be authenticated before they are loaded into main memory 228. The flow continues at block 1012.

At block 1012, the file unit 238 allows access to the wagering game files that have been loaded into memory. The flow continues at block 1014.

At block 1014, based on game state and/or records of file access and usage, the file unit 238 modifies the loading priority list. For example, referring to FIG. 7, the file unit 238 may assign a higher priority to files D (708) and F (712) after file C (706) has been accessed. In contrast, the file unit 238 may assign a lower priority to file A (702) after file D (708) has been accessed. As another example, the file unit 238 may modify loading priorities after detecting particular game states. For instance, in response to detecting a game state, the file unit 238 can load a low resolution image file into main memory 228. The file unit 238 can increase the priority of a related high resolution image file, accelerating authentication and loading of the high resolution image in anticipation that the player will want to see the high resolution image. The flow continues at block 1016.

At block 1016, the file unit 238 determines whether there are more files to load and/or remove. If there are more files to load/remove, the flow continues at block 1010. Otherwise, the flow ends.

Figure 11:
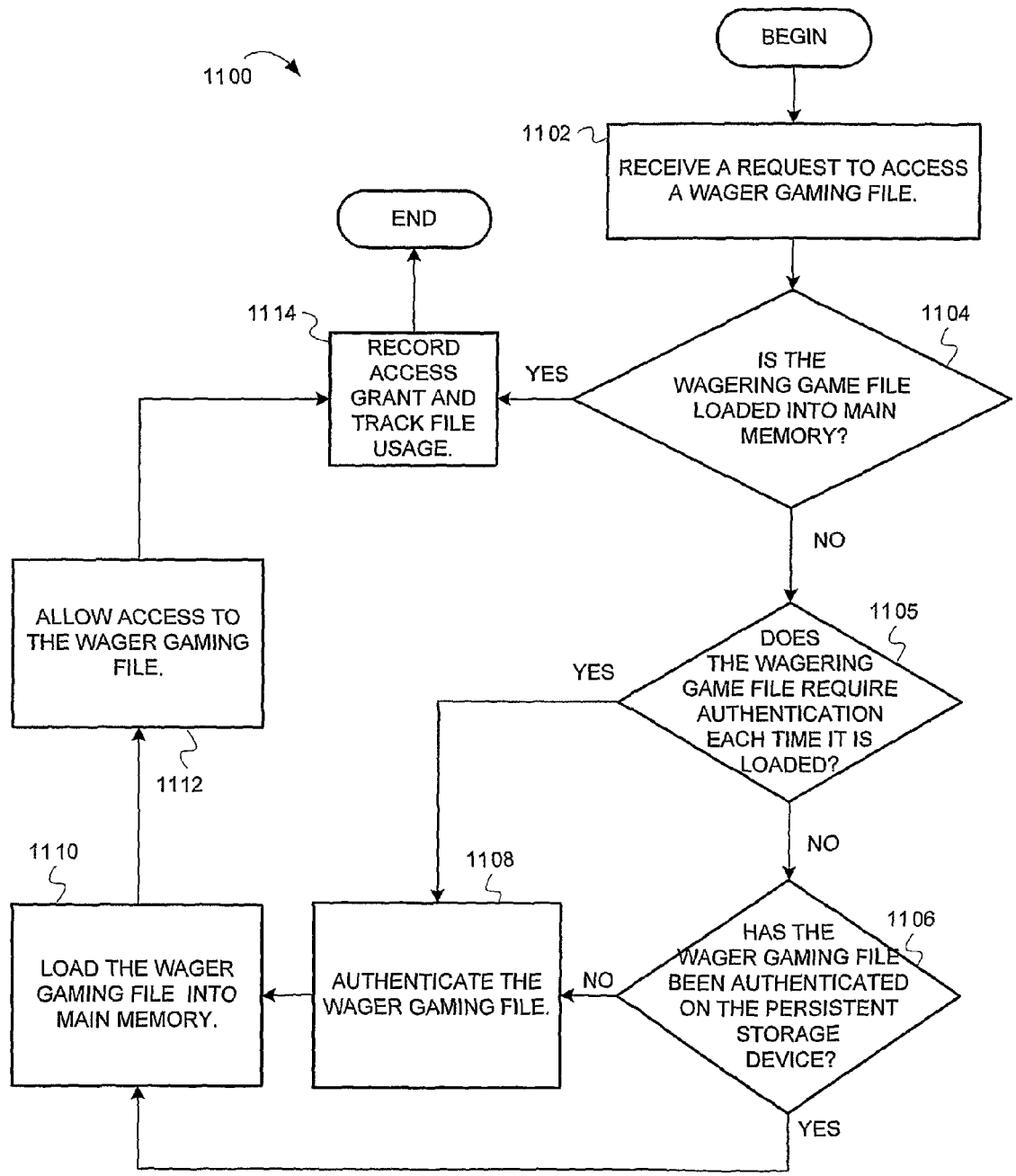
FIG. 11 is a flow diagram illustrating operations for granting access to wagering game files when some of the wagering game files have been predictively loaded and authenticated, according to example embodiments of the invention.

While FIG. 10 describes operations for predictively loading and predictively authenticating wagering game files, FIG. 11 describes operations for providing access to wagering game files. This description continues with a discussion of FIG. 11.

FIG. 11 is a flow diagram illustrating operations for granting access to wagering game files when some of the wagering game files have been predictively loaded and authenticated, according to example embodiments of the invention. The flow of 1100 begins at block 1102.

At block 1102, the file unit 238 receives a request to access a wagering game file. The request can originate from the wagering game unit 232 or any other component of the wagering game device 206. The flow continues at block 1104.

At block 1104, the file unit 238 determines whether the requested wagering game file resides in the main memory 228. If the file resides in main memory 228, the flow continues at block 1114. Otherwise, the flow continues at block 1105.

At block 1105, the file unit 238 determines whether the wagering game file requires authentication each time it is loaded into main memory 228. If the wagering game file requires authentication each time it is loaded, the flow continues at block 1108. Otherwise, the flow continues at block 1106.

At block 1106, the file unit 238 determines whether the requested wagering game file has been authenticated on the storage unit 230. In one embodiment, every wagering game file must be authenticated while it resides on the storage unit 230. If the wagering game file has been authenticated on the storage unit 230, the flow continues at block 1110. Otherwise, the flow continues at block 1108.

At block 1108, the authentication unit 234 authenticates the requested wagering game file. The flow continues at block 1110.

At block 1110, the file unit 238 loads the wagering game file into main memory 228. The flow continues at block 1112.

At block 1112, the file unit 238 allows access to the requested wagering game file. The flow continues at block 1114.

At block 1114, the file unit 238 records the access grant and tracks usage of the wagering game file. In one embodiment, information about access grant and file usage can be used to assign priorities when predictively loading and predictively authenticating wagering game files (see discussion of FIG. 10). From block 1114, the flow ends.

Predictive Authentication with Predictive Transmission

This section describes operations for predictively authenticating and transmitting wagering game files over a wagering game network.

In a distributed gaming environment, wagering game devices may not store all wagering game files needed for presenting a wagering game. If a wagering game device is lacking files, it can request the files from other network devices. However, authentication latencies and network transmission latencies may cause delays in presenting a wagering game. In one embodiment, wagering game network devices can use predictive authentication and predictive transmission to avoid these latencies. The operations described below are applicable in peer-to-peer, client/server, and other environments.

Figure 12:
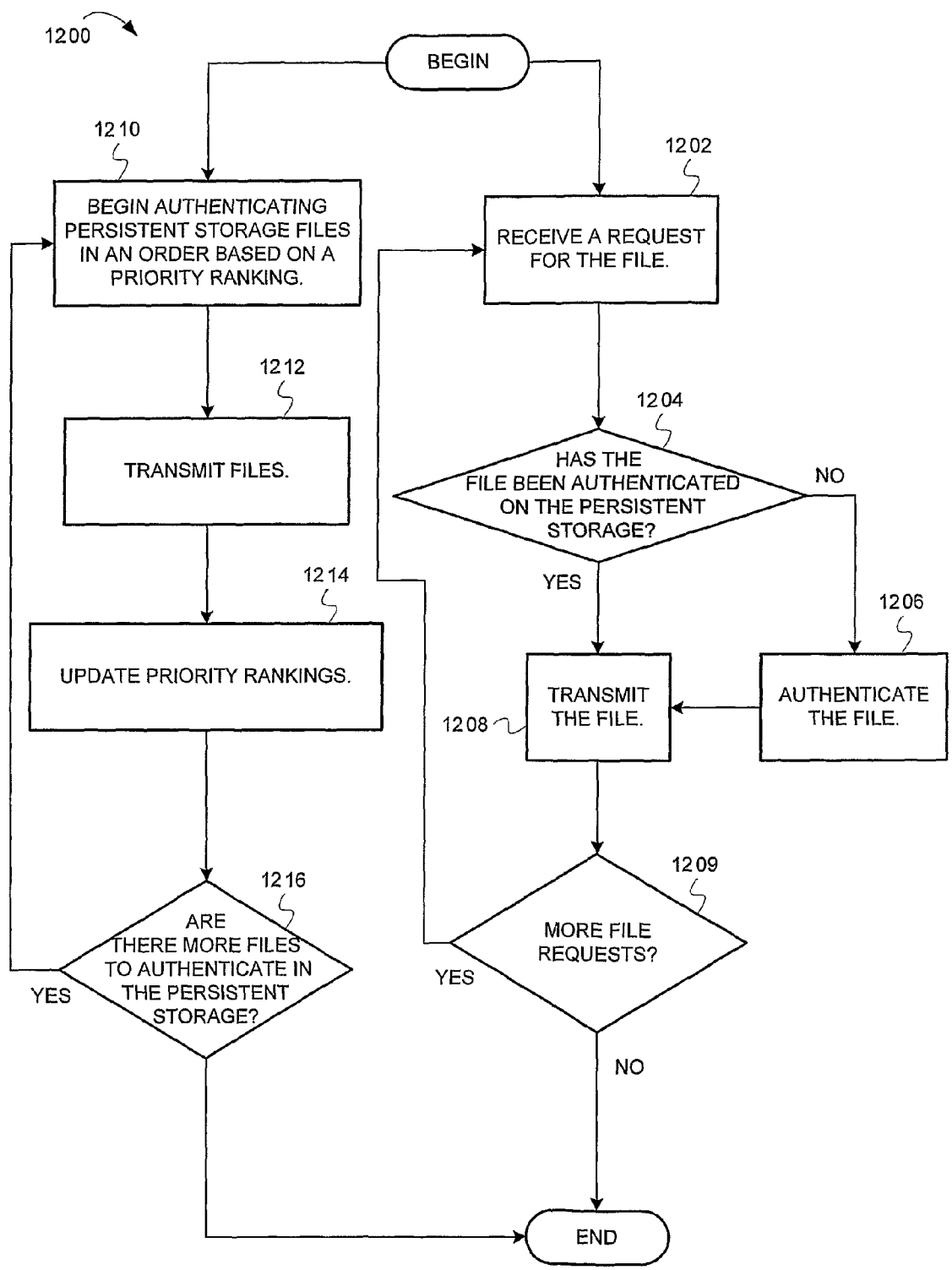
FIG. 12 is a flow diagram illustrating operations for predictively authenticating and predictively transmitting wagering game files, according to example embodiments of the invention.

FIG. 12 is a flow diagram illustrating operations for predictively authenticating and predictively transmitting wagering game files, according to example embodiments of the invention. The flow 1200 begins in parallel at blocks 1202 and 1210.

At block 1202, a wagering game device receives a request for a wagering game file. In one embodiment, the request is received from another wagering game device on a wagering game network. The flow continues at block 1204.

At block 1204, the wagering game device determines whether the file has been authenticated while residing in the storage unit 230. If the file has not been authenticated, the flow continues at block 1206. Otherwise, the flow continues at block 1208.

At block 1206, the wagering game device's authentication unit 232 authenticates the file. The flow continues at block 1208.

At block 1208, the wagering game device's network interface unit 224 transmits the wagering game file over a wagering game network to another wagering game device 206. From block 1208, the flow continues at block 1209.

At block 1209, the wagering game device determines whether it will receive more file requests. If it will not receive more file requests, the flow ends. Otherwise, the flow continues at block 1202.

At block 1210, the authentication unit 232 authenticates files on the storage unit 230 in order of priority rankings. As described above, files may be assigned a priority based on file dependencies and file usage. The flow continues at block 1212.

At block 1212, the wagering game device's file unit 238 transmits, to another wagering game device, files that may soon be needed by other network devices. In one embodiment, the file unit 238 transmits some of the highest priority files that have been authenticated. In one embodiment, the wagering game device does not transmit files until they are explicitly requested. The flow continues at block 1214.

At block 1214, the file unit 238 updates priority rankings. For example, the file unit 238 updates priorities based on which files have been authenticated and/or transmitted. In one embodiment, files dependent on those that have been authenticated or transmitted are assigned higher priorities. The flow continues at block 1216.

At block 1216, the wagering game device determines whether there are more files to authenticate and/or transmit. If there are more files to authenticate and/or transmit, the flow continues at block 1210. Otherwise, the flow ends.

Example Wagering Game Devices and Wagering Game Networks

This segment describes example wagering game devices and wagering game networks with which embodiments of the invention can be practiced.

Example Wagering Game Network

Figure 13:
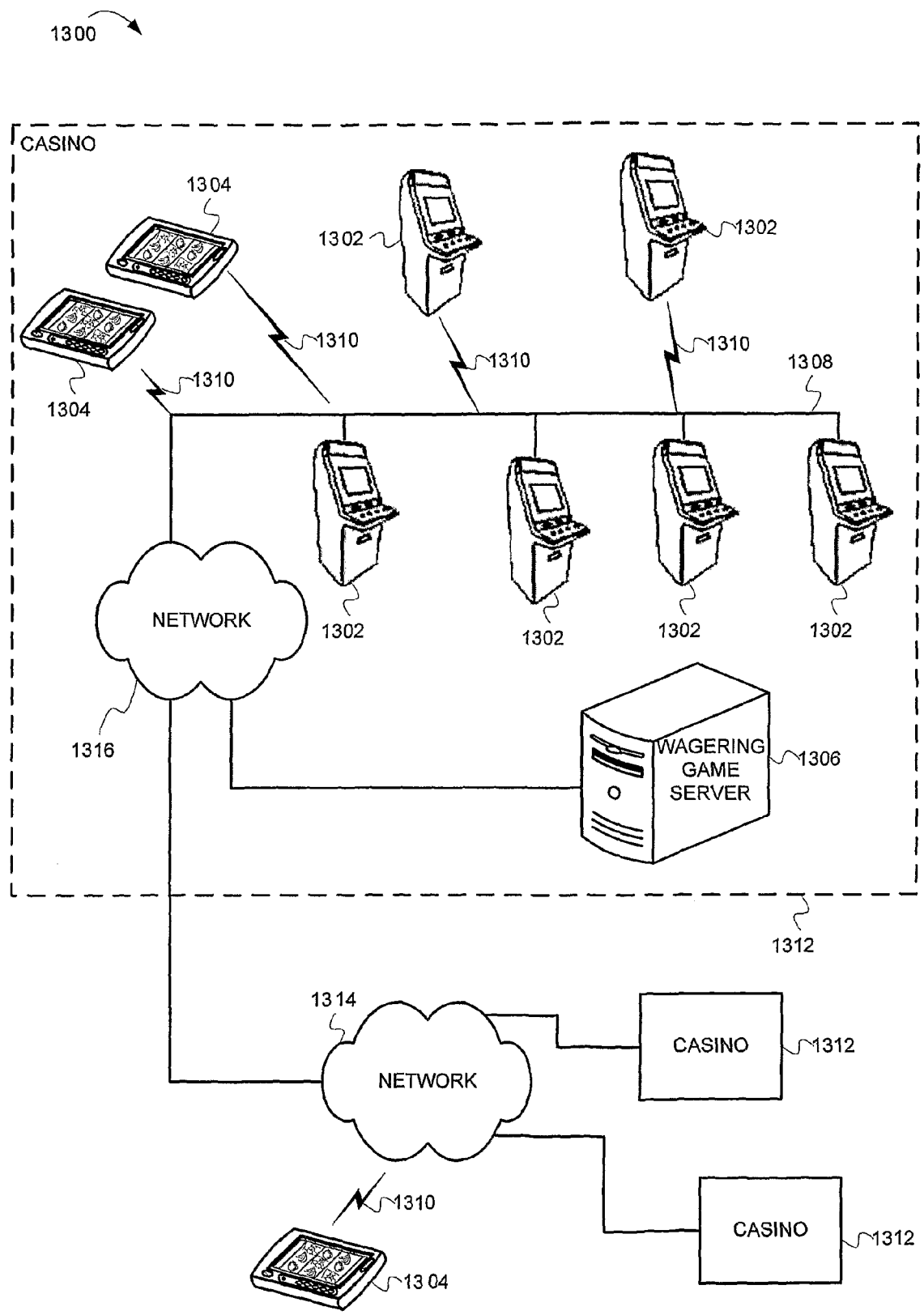
FIG. 13 is a block diagram illustrating a wagering game network, according to example embodiments of the invention.

FIG. 13 is a block diagram illustrating a wagering game network, according to example embodiments of the invention. As shown in FIG. 13 the wagering game network 1300 includes a plurality of casinos 1312 connected to a communications network 1314. Each of the plurality of casinos 1312 includes a local area network 1316, which includes wagering game machines 1302, mobile wagering game devices 1304, and a wagering game server 1306. The wagering game machines 1302, mobile wagering game device 1304, and/or and wagering game server 1306 can include hardware and machine-readable media including instructions for loading and authenticating wagering game files, as described herein.

In one embodiment, the wagering game server 1306 can facilitate switching between networks in concert with serving wagering games over the local area network 1316.

The wagering game machines described herein can be of any suitable form factor, such as floor standing models, mobile units, bartop models, workstation-type console models, etc. In one embodiment, the wagering game network 1300 can include other network devices, such as accounting servers, wide area progressive servers, and/or other devices suitable for use in connection with embodiments of the invention.

The components of each casino 1312 can communicate over wired 1308 and/or wireless connections 1310. Furthermore, they can employ any suitable connection technology, such as Bluetooth, IEEE 802.11, Ethernet, public switched telephone networks, SONET, etc.

Example Wagering Game Machine

Figure 14:
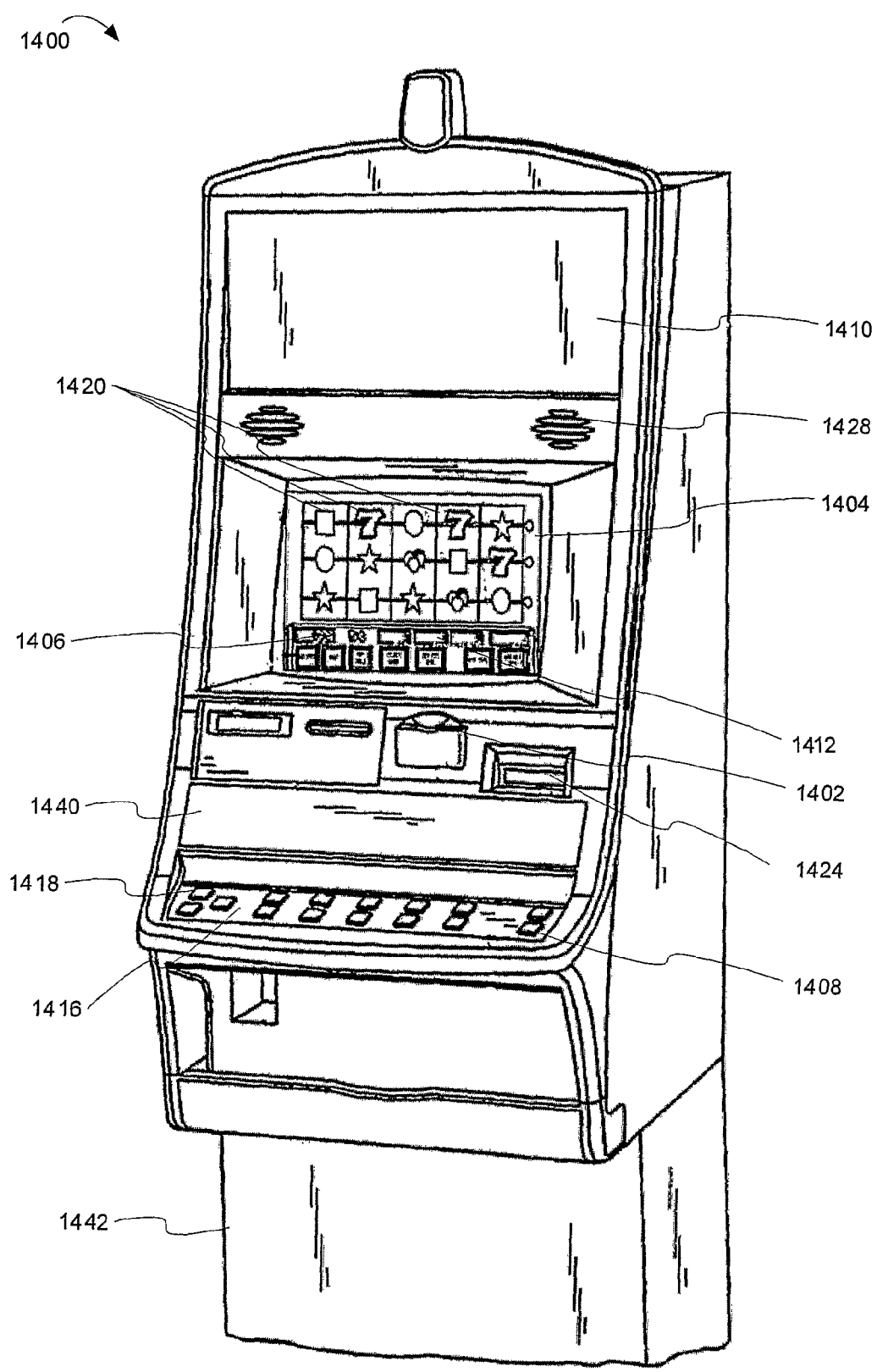
FIG. 14 is a perspective view of a wagering game machine, according to example embodiments of the invention.

FIG. 14 is a perspective view of a wagering game machine, according to example embodiments of the invention. As shown in FIG. 14, the wagering game machine 1400 can be a computerized slot machine having the controls, displays, and features of a conventional slot machine.

The wagering game machine 1400 can be mounted on a stand 1442 or it can be constructed as a pub-style tabletop game (not shown). As a result, the wagering game machine 1400 can be operated while players are standing or seated. Furthermore, the wagering game machine 1400 can be constructed with varying cabinet and display designs. The wagering game machine 1400 can incorporate any primary game upon which monetary value can be wagered, such as slots, poker, or keno, and additional bonus round games. The symbols and indicia used on and in the wagering game machine 1400 can take mechanical, electrical, or video form.

As illustrated in FIG. 14, the wagering game machine 1400 includes a coin slot 1402 and bill acceptor 1424. Players can place coins in the coin slot 1402 and paper money or ticket vouchers in the bill acceptor 1424. Other devices can be used for accepting payment. For example, credit/debit card readers/validators can be used for accepting payment. Additionally, the wagering game machine 1400 can perform electronic funds transfers and financial transfers to procure monies from financial accounts. When a player inserts money in the wagering game machine 1400, a number of credits corresponding to the amount deposited are shown in a credit display 1406. After depositing the appropriate amount of money, a player can begin playing the game by pushing play button 1408. The play button 1408 can be any play activator used for starting a wagering game or sequence of events in the wagering game machine 1400.

As shown in FIG. 14, the wagering game machine 1400 also includes a bet display 1412 and one or more "bet" buttons on the panel 1416. The player can place a bet by pushing one or more of the bet buttons on the panel 1416. The player can increase the bet by one or more credits each time the player pushes a bet button. When the player pushes a "bet one" button 1416, the number of credits shown in the credit display 1406 decreases by one credit, while the number of credits shown in the bet display 1412 increases by one credit.

A player may end the gaming session or "cash-out" by pressing a cash-out button 1418. When a player cashes-out, the wagering game machine 1400 dispenses a voucher or currency corresponding to the number of remaining credits. The wagering game machine 1400 may employ other payout mechanisms such as credit slips (which are redeemable by a cashier) or electronically recordable cards (which track player credits), or electronic funds transfer.

The wagering game machine also includes a primary display unit 1404 and a secondary display unit 1410 (also known as a "top box"). The wagering game machine may also include an auxiliary video display 1440. In one embodiment, the primary display unit 1404 displays a plurality of video reels 1420. According to embodiments of the invention, the display units 1404 and 1410 can include any visual representation or exhibition, including moving physical objects (e.g., mechanical reels and wheels), dynamic lighting, and video images. In one embodiment, each reel 1420 includes a plurality of symbols such as bells, hearts, fruits, numbers, letters, bars or other images, which correspond to a theme associated with the wagering game machine 1400. Additionally, the wagering game machine 1400 also includes an audio presentation unit 1428. The audio presentation unit 1428 can include audio speakers or other suitable sound projection devices.

In one embodiment, the wagering game machine 1400 can simultaneously (or virtually simultaneously) authenticate wagering game files and/or components while presenting wagering games, as described herein.

General

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description.

Herein, block diagrams illustrate example embodiments of the invention. Also herein, flow diagrams illustrate operations of the example embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, although the flow diagrams depict serial operations, certain embodiments could perform certain of those operations in parallel.

The invention claimed is:

1. A computer-implemented method comprising:
   authenticating a first set of wagering game files stored on a storage device of a wagering game machine;
   when the authentication of the first set of wagering game files is successful, starting a basic version of a wagering game on the wagering game machine;
   during the wagering game, authenticating a second set of wagering game files stored on the storage device of the wagering game machine to evolve the wagering game from the basic version to an advanced version having enhanced wagering game content, wherein the first set of wagering game files and the second set of wagering game files are both utilized for execution of the advanced version of the wagering game; and
   when the authentication of the second set of wagering game files is not successful, stopping the wagering game.

2. The method of claim 1, further comprising:
   during the wagering game, verifying unused spaces of the storage device of the wagering game machine; and
   if the verification of the unused spaces is not successful, stopping the wagering game.

3. The method of claim 1, further comprising:
   during the wagering game, receiving a request for a wagering game file;
   determining whether the wagering game file has been authenticated;
   if the wagering game file has been authenticated, allowing access to the wagering game file; and
   if the wagering game file has not been authenticated, preventing access to the wagering game file.

4. The method of claim 1, wherein the first set of wagering game files and the second set of wagering game files are defined in a load order file table.

5. The method of claim 1, wherein the first set of wagering game files includes files selected from the group consisting of boot files, operating system files, default audio files, default video files, required audio files, required video files, and wagering game executable files.

6. The method of claim 1, wherein if the authentication of the first set of wagering game files and the authentication of the second set of wagering game files is not completed within a specific amount of time, the wagering game is stopped.

7. A wagering game comprising:
   a storage device including a first set of wagering game files and a second set of wagering game files, the first set of wagering game files executable to start a basic version of a wagering game and the second set of wagering game files executable to evolve the wagering game from the basic version to an advanced version having enhanced wagering game content; and
   an authentication unit configured to authenticate the first set of wagering game files prior to starting a wagering game and configured to authenticate the second set of wagering game files after starting the wagering game, wherein the first set of wagering game files and the second set of wagering game files are both utilized for execution of the advanced version of the wagering game;
   wherein the authentication unit is further configured to stop the wagering game if the authentication of the second set of files is not successful.

8. The wagering game of claim 7, wherein the storage device further includes unused space, wherein the authentication unit is further configured to, during the wagering game, verify the unused space, and wherein the authentication unit is further configured to stop the wagering game if the verification of the unused space is unsuccessful.

9. The wagering game of claim 7, wherein the authentication unit is further configured to, during the wagering game, determine whether a wagering game file has been authenticated, and if the wagering game file has been authenticated, the authentication unit is further configured to allow access to the wagering game file, and if the wagering game file has not been authenticated, the authentication unit is further configured to prevent access to the wagering game file.

10. The wagering game of claim 7, wherein the authentication unit is configured to allow access to second set of wagering game files as they become authenticated.

11. The wagering game of claim 7, wherein the storage device is a hard-disk drive.

12. A non-transitory machine-readable medium including instructions which when executed by a machine cause the machine to perform operations comprising:
 authenticating a first set of wagering game files;
 after authenticating the first set of wagering game files, simultaneously presenting a basic version of a wagering game using the first set of wagering game files while authenticating certain files of a second set of wagering game files to evolve the wagering game from the basic version to an advanced version having enhanced wagering game content, wherein the basic version of the wagering game does not use the second set of wagering game files, wherein the advanced version of the wagering game uses both the first set of wagering game files and the second set of wagering game files, and wherein the wagering game is stopped if the authentication of the second set of wagering game files is not successful.

13. The machine-readable medium of claim 12, wherein the operations further comprise:
 verifying empty space on a hard disk drive, wherein the verifying occurs during presentation of the basic version of the wagering game.

14. The machine-readable medium of claim 12, wherein authenticating the second set of wagering game files includes verifying digital signatures associated with files of the second set.

15. The machine-readable medium of claim 12, wherein the wagering game files include audio content, video content, or wagering game executable files.

16. The machine-readable medium of claim 12, wherein presenting a basic version of a wagering game includes,
 determining that one of the second set of wagering game files is inaccessible; and
 accessing one of the first set of wagering game files instead of the one of the second set.

* * * * *

UNITED STATES PATENT AND TRADEMARK OFFICE
CERTIFICATE OF CORRECTION

PATENT NO. : 8,702,502 B2  Page 1 of 1
APPLICATION NO. : 12/092744
DATED : April 22, 2014
INVENTOR(S) : Adiraju et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1405 days.

Signed and Sealed this
Twenty-ninth Day of September, 2015

Michelle K. Lee
*Director of the United States Patent and Trademark Office*